United States Patent
Cable et al.

(10) Patent No.: US 7,655,199 B2
(45) Date of Patent: Feb. 2, 2010

(54) PROCESS FOR URANIUM RECOVERY USING ANION EXCHANGE RESIN

(75) Inventors: Peter Ian Cable, Alberton (ZA); Emmanuel Zaganiaris, Chauny (FR)

(73) Assignee: Rohm and Haas Company, Philadelphia, PA (US)

( * ) Notice: Subject to any disclaimer, the term of this patent is extended or adjusted under 35 U.S.C. 154(b) by 422 days.

(21) Appl. No.: 11/604,967

(22) Filed: Nov. 28, 2006

(65) Prior Publication Data

US 2007/0217975 A1  Sep. 20, 2007

(51) Int. Cl.
*C22B 60/00* (2006.01)
(52) U.S. Cl. .............. 423/6; 423/7; 423/8; 423/11; 423/18
(58) Field of Classification Search ............ 423/6, 423/7, 8, 11, 18
See application file for complete search history.

(56) References Cited

U.S. PATENT DOCUMENTS 2,795,480 A    6/1957  Stephen, et al.
4,199,470 A    4/1980  Kurohara et al.
5,180,526 A    1/1993  Holderness et al

FOREIGN PATENT DOCUMENTS

DE    195 05 045 C1    7/1996
GB    893 286 A        4/1962

OTHER PUBLICATIONS

Abstract of ZA 6702852, no date, Rohm & Haas Co., US priority application filed Aug. 1, 1966, Derwent Acc. No. 1968-13334Q.*
Translation of DE 19505045, Jul. 1996.*
Haines, A. K., "The Development of Continuous Fluidized-bed Ion Exchange In South Africa, . . . " J.S. AFR. Inst. Min. Metall., vol. 78, No. 12, 1978, pp. 303-315.

* cited by examiner

*Primary Examiner*—Steven Bos
(74) *Attorney, Agent, or Firm*—Tifani M. Cottingham

(57) ABSTRACT

The present invention relates to a process for the recovery of uranium in high silica environments comprising the use of a strong base macroreticular ion exchange resin.

9 Claims, No Drawings ns for uranium recovery in high silica environments. There is a need for a process using ion exchange resins for uranium recovery in high silica environments without subjecting the ion exchange resins to fouling with silica. Silica fouling presents a problem in the process of uranium recovery because it affects the kinetics of both loading and elution of the anion exchanger. Kinetics of loading and elution are important because these characteristics are linked to economical efficiency and productivity of the uranium recovery process as a whole.

PROCESS FOR URANIUM RECOVERY USING ANION EXCHANGE RESIN

The present invention relates to the use of strong base macroreticular anion exchange resins for uranium recovery in high silica environments. There is a need for a process using ion exchange resins for uranium recovery in high silica environments without subjecting the ion exchange resins to fouling with silica. Silica fouling presents a problem in the process of uranium recovery because it affects the kinetics of both loading and elution of the anion exchanger. Kinetics of loading and elution are important because these characteristics are linked to economical efficiency and productivity of the uranium recovery process as a whole.

One attempt to overcome the problems associated with uranium recovery is disclosed in A. K. Haines' "The South African Programme on the Development of Continuous Fluidized Bed Ion Exchange with Specific Reference to its Application to the Recovery of Uranium." Although this reference discloses the use of macroreticular ion exchange resins for uranium recovery, the weak base resins disclosed in Haines were fouled by silica buildup, which needed to be removed in an extensive separate step. Thus there was a need to economize the clean-up treatment process for the anion exchange resin. The problem addressed by the present invention is to provide a process for the recovery of uranium in high silica environments using strong base macroreticular anion exchange resins without the need for frequent and extensive resin clean-up treatment as required in Haines.

Another attempt to address the need for a process for uranium recovery at high silica levels is the use of strong base gel resins. Strong base gel resins are susceptible to fouling and require extensive cleanup of the resin in subsequent steps. This problem is solved by the present invention. At high silica loadings, strong base macroreticular anion exchange resins, such as those of the present invention, are preferable because they demonstrate acceptable kinetics of loading and elution, acceptable NaOH consumption, as well as stability of performance of the resin over time as compared to strong base gel anion exchange resins at lower silica loadings.

The present invention is a process that uses strong base anionic exchange resins of the macroreticular type to overcome the problem of silica fouling and to recover uranium more efficiently than the process that is used with ion exchange resins of other types and ionic strengths.

In a first aspect of the present invention, there is provided:
a process comprising:
a) obtaining a uranium and silica containing sample;
b) processing the uranium and silica containing sample to form a uranium and silica containing material wherein the material contains
  (i) greater than or equal to 100 mg $SiO_2$/liter; and
  (ii) dissolved uranium
b) removing the dissolved uranium from the material using at least one strong base macroreticular anion exchange resin to obtain a uranium product in combination with the strong base macroreticular anion exchange resin; and
c) eluting and recovering the uranium product from the combination in step b).

As used herein the term anion exchange resin is defined as crosslinked polyelectrolytes bearing cationic groups. Suitable cationic exchange groups include but are not limited to tertiary or quaternary ammonium groups which are associated with mobile anions.

As used herein, macroreticular anion exchange resins are anion exchange resins comprising rigid pores, hereinafter "macropores." The distribution of the macropores throughout the anion exchange resin particles is stable with time. Macropore diameters range from several Angströms to many hundreds of Angströms. Strong base macroreticular resins of the present invention have macropore diameters from 100 to 400 Angströms, preferably 120 to 350 Angströms, and more preferably 150 to 300 Angströms. These macropores are interconnected with each other forming a network going from the surface to the center of the resin bead. As a consequence of this structure, an external solution can flow through the pores of the strong base macroreticular resins from the surface of the resin to the interior freely and without changing in ionic strength. The porosity of the strong base anion exchange resins of the present invention is from 0.15 to 0.50 ml/ml, preferably 0.2 to 0.4 ml/ml, and more preferably 0.25 to 0.35 ml/ml.

As used herein, "strong base" anion exchange resins are defined as anion exchange resins that contain quaternary ammonium functional groups. Suitable strong base macroreticular resins of the present invention include but are not limited to "Type 1" or "Type 2" having uniform or Gaussian particle size distribution. Examples of strong base macroreticular anion exchange resins of the present invention include but are not limited to functionalized styrene divinylbenzene or polyacrylic copolymers with the functional group being a quaternized ammonium group. The percentage of strong base groups for styrene-divinylbenzene containing quaternized ammonium groups is often greater than 99%. Examples of strong base macroreticular resins of the type used in the present invention can be obtained from Rohm and Haas Company. Examples of these strong base macroreticular resins include but are not limited to Amberlite™ IRA900 Cl resin, Amberlite™ IRA910U Cl resin, and Ambersep™ 920U Cl or Lewatit™ MP600 WS and Lewatit™ MonoPlus MP500 from Lanxess Corporation.

As used herein, "high silica" levels are defined as an environment where the silica level in the uranium and silica containing material is greater than or equal to 100 mg $SiO_2$/liter (100 ppm). The level of silica in the uranium and silica containing material of the present invention is preferably from 100 to 3000 mg $SiO_2$/liter.

Traditionally uranium samples may be extracted from mines as ore or may be extracted as liquid leach; however, other conventional techniques to extract uranium samples may be contemplated by those of ordinary skill in the art and may be used in the present invention. Once a sample is obtained by one or more of these methods, the sample must be converted to the uranium and silica containing material of the present invention. The sample may then be leached to form the material. The material of the present invention comprises dissolved uranium and greater than or equal to 100 mg$SiO_2$/liter but may comprise other materials. The material if obtained by leaching the sample may be referred to as a leachate. As used herein, "leachate" is defined as the product obtained after the uranium and silica containing material has undergone a leaching process. The leachate could be comprised of one or more physical states for example, solids, liquid, and colloidal materials. In one embodiment the leachate is in the form a liquid. Although a leaching process is described herein to obtain the material from the sample, other methods known by those of skill in the art may be used, as long as the resultant material contains dissolved uranium and greater than or equal to 100 mg$SiO_2$/liter.

The leaching process can be performed in any of the following manners including but not limited to in situ leaching, heap leaching, and batch-wise leaching.

After the uranium and silica containing is leached and the dissolved uranium is obtained, the dissolved uranium must be removed from the uranium and silica containing material using at least one strong base macroreticular anion exchange resin. A uranium product is produced in combination with the strong base macroreticular anion exchange resin. The combination is defined as the uranium product loaded onto the strong base macroreticular anion exchange resin. Here, the uranium is no longer dissolved. Suitable equipment for the removal of the dissolved uranium from the liquid leachate include but are not limited to fixed bed ion exchange columns, fluidized bed continuous ion exchange columns, moving packed bed continuous ion exchange columns, Resin-in-Pulp and Resin-in-Leach.

After the uranium product in combination with the strong base macroreticular anion exchange resin is obtained, the strong base macroreticular anion exchange resin must be separated from the uranium product and the resulting uranium must be recovered. Conventional methods for separating the uranium product and recovering the uranium may be employed. One method for separating the uranium product from the strong base macroreticular anion exchange resin is by eluting the strong base macroreticular anion exchange resin. Suitable chemicals for eluting the uranium product from the strong base macroreticular anion exchange resin include but are not limited to nitrate such as ammonium nitrate, chloride such as sodium chloride, and sulfuric acid. These compounds may be used individually, or in mixtures. In one embodiment the equipment used to elute the uranium is a fixed bed continuous system with one or more columns.

Suitable methods for the recovery of the uranium product include but are not limited to ion exchange, solvent extraction, precipitation extraction, or a combination thereof, for example solvent extraction followed by precipitation extraction.

The resulting uranium product is uranium recovered through the use of the strong base macroreticular anion exchange resin. The following comparative example demonstrates that this strong base macroreticular anion exchange resin is resistant to silica fouling in high silica containing environments.

EXAMPLE

The macroreticular strong base anion exchange resin Amberlite™ IRA910U Cl resin and the gel strong base anion exchange resin Amberjet™ 4400 Cl resin were placed in baskets and leach liquors containing 150-200 ppm uranium, 20 g $SO_4$/L, 1 g Fe/L and 500-700 mg/L of $SiO_2$, at a pH of 1.8 was allowed to flow through at the Rössing Uranium Mine, Namibia, for a period of eight months. After this exposure, resin samples were extracted, analyzed and their performance in uranium recovery was evaluated and compared to new resins.

Table 1 gives the resin properties after the exposure.

TABLE 1

| Sample designation | Total capacity (eq/L R) | Moisture (%) | % $SiO_2$ |
|---|---|---|---|
| IRA910U-sample 1 | 1.1 | 56 | 0 |
| IRA910U-sample 2 | 1.1 | 54 | 13 |
| IRA910U-sample 3 | 1.1 | 58 | 20 |
| Jet4400-comparative sample 1 | 1.6 | 43 | 0 |
| Jet4400-comparative sample 2 | 1.6 | 42.2 | 1 |
| Jet4400-comparative sample 3 | 1.5 | 41 | 8 |

In Table 1, IRA910U stands for the product Amberlite™ IRA910U Cl resin and Jet4400 stands for the product Amberjet™ 4400 Cl resin. Samples IRA910U-sample 1 and Jet4400-comparative sample 1 represent resins in new condition; all others represent exposed resins containing the indicated amount of silica.

The samples were evaluated as follows: 100 ml of resin was placed in a column and a synthetic solution containing 75 mg Uranium/L, 0.24 g Fe/L and 24 g $SO_4$/L at a pH of 1.8 was allowed to pass through the resin bed at a flow rate of 5 BV/h (BV=Bed Volume) and ambient temperature. Initially, the samples were fully eluted so that no or very little uranium was found on the resin. In a first cycle, the resins were exhausted with the feed solution and regenerated with 5 BV of 13% $H_2SO_4$ at a flow rate of 1 BV/h and ambient temperature, followed by a water displacement with 3 BV of water. Then a second cycle was performed where the uranium concentration in the effluent (the leakage) was determined and from this, the loading capacity of the resin was calculated to an end-point of 90% of the feed concentration.

The results obtained in the second cycle are summarized in Table 2.

TABLE 2

| Sample designation | Initial uranium leakage (mg $U_3O_8$/L) | Loading capacity (g $U_3O_8$/L R) |
|---|---|---|
| IRA910U-sample 1 | 0 | 32 |
| IRA910U-sample 2 | 4 | 29.1 |
| IRA910U-sample 3 | 7 | 26.5 |
| Jet4400-comparative sample 1 | 4 | 45.2 |
| Jet4400-comparative sample 2 | 9 | 37.7 |
| Jet4400-comparative sample 3 | 19 | 20.0 |

As seen in Table 2, Amberlite™ IRA910U Cl resin in fresh condition gave a lower initial uranium leakage than Amberjet™ 4400 Cl resin but also, a lower capacity. Samples 2 and 3 of both resins having been fouled with silica gave higher leakage and lower operating capacities. The capacity decrease, expressed as percent of the capacity of the new resin, is summarized in Table 3.

TABLE 3

| Operating capacity decrease with respect to new resin (%) | | |
|---|---|---|
| | Amberlite ™ IRA910U Cl | Amberjet ™ 4400 Cl (comparative) |
| Sample 2 | 9 | 17 |
| Sample 3 | 17 | 56 |

As observed, the relative capacity decrease of Amberlite™ IRA910U Cl resin was significantly less than that of Amberjet™ 4400 Cl resin, even though the amount of silica on Amberjet™ 4400 Cl resin was much less.

The increase in leakage implies that some of the incoming uranium was not recovered but it went out with the effluents (barrens). This quantity of uranium has to be retreated in order to recover it, otherwise it will be lost. This operation decreases the productivity of the plant. As seen from table 2, Amberjet™ 4400 Cl, samples 2 and 3, gave 2 to 3 times higher uranium leakage compared to the corresponding samples of Amberlite™ IRA910U Cl resin.

Overall therefore, the macroreticular resin Amberlite™ IRA910U Cl resin fouled with silica gave relatively lower capacity decrease and lower uranium leakage compared to the gel-type resin Amberjet™ 4400 Cl resin fouled with less silica than Amberlite™ IRA910U Cl resin.

What is claimed is:

1. A process comprising:
   a) obtaining a uranium and silica containing sample;
   b) leaching the uranium and silica containing sample to form a leachate wherein the leachate contains
      (i) greater than or equal to 100 mg $SiO_2$/liter; and
      (ii) dissolved uranium
   b) removing the dissolved uranium from the material using at least one strong base macroreticular anion exchange resin to obtain a uranium product in combination with the strong base macroreticular anion exchange resin; and
   c) eluting and recovering the uranium product from the combination in step b).

2. The process of claim 1 wherein the dissolved uranium is obtained by leaching the uranium and silica containing sample with sulfuric acid.

3. The process of claim 1 wherein the composition of the strong base macroreticular ion exchange resin comprises styrene-divinylbenzene containing functional quaternized ammonium groups.

4. The process of claim 1 wherein the strong base macroreticular anion exchange resin has a porosity of from 0.15 to 0.50 ml/ml.

5. The process of claim 1 wherein the strong base macroreticular anion exchange resin has an average pore diameter from 100 to 400 Angstroms.

6. The process of claim 1 wherein the uranium product is eluted with at least one agent selected from the following: ammonium nitrate, sodium chloride or sulfuric acid.

7. The process of claim 1 wherein the uranium product is recovered by precipitation extraction in step c).

8. The process of claim 1 wherein the uranium product is recovered by solvent extraction followed by precipitation extraction.

9. The process of claim 1 wherein the leachate contains from 100 to 3000 mg $SiO_2$/liter.

* * * * *

UNITED STATES PATENT AND TRADEMARK OFFICE
CERTIFICATE OF CORRECTION

PATENT NO.         : 7,655,199 B2                                    Page 1 of 1
APPLICATION NO.    : 11/604967
DATED              : February 2, 2010
INVENTOR(S)        : Cable et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Twenty-third Day of November, 2010

David J. Kappos
*Director of the United States Patent and Trademark Office*